United States Patent
Mizuno et al.

(10) Patent No.: US 6,709,751 B1
(45) Date of Patent: Mar. 23, 2004

(54) CERAMIC PRODUCT TO BE USED AROUND WATER AND METHOD OF ANTIFOULING TREATMENT THEREFOR

(75) Inventors: Haruyuki Mizuno, Tokoname (JP); Shigeo Imai, Tokoname (JP); Masashi Miura, Tokoname (JP); Kazuyoshi Iso, Tokoname (JP); Hiroyuki Miyamoto, Tokoname (JP); Takeshi Nishikawa, Tokoname (JP); Shozo Yamamoto, Tokoname (JP); Keisuke Yamamoto, Tokoname (JP); Yoshiyuki Tsukada, Tokoname (JP); Yasunobu Masu, Tokoname (JP)

(73) Assignee: Inax Corproation, Aichi (JP)

( * ) Notice: Subject to any disclaimer, the term of this patent is extended or adjusted under 35 U.S.C. 154(b) by 0 days.

(21) Appl. No.: 09/937,482

(22) PCT Filed: Mar. 23, 2000

(86) PCT No.: PCT/JP00/01800

§ 371 (c)(1),
(2), (4) Date: Sep. 26, 2001

(87) PCT Pub. No.: WO00/59846

PCT Pub. Date: Oct. 12, 2000

(30) Foreign Application Priority Data

Apr. 2, 1999 (JP) .......................................... 11/097010

(51) Int. Cl.[7] .................................................. B32B 9/04
(52) U.S. Cl. ....................... 428/447; 428/688; 428/689; 428/697; 427/299; 427/307; 427/309; 427/387
(58) Field of Search .................................. 428/447, 688, 428/689, 697; 427/299, 307, 309, 387

(56) References Cited

U.S. PATENT DOCUMENTS 5,599,893 A * 2/1997 Asai et al. ...................... 528/12
6,174,608 B1 * 1/2001 Bertocchi et al. ........... 428/426

FOREIGN PATENT DOCUMENTS

| | | |
|---|---|---|
| EP | 696627 | 2/1996 |
| EP | 0 867 490 | 9/1998 |
| JP | 04-240171 | 8/1992 |
| JP | 2000-232948 | 8/2000 |
| JP | 2000-265526 | 9/2000 |
| JP | 2000-273937 | 10/2000 |
| JP | 2001-029248 | 2/2001 |
| WO | 97/36967 | 10/1997 |

OTHER PUBLICATIONS

Machine translation from the JPO website at http://www.ip-dl.jpo.go.jp/homepg_e.ipdl, JP 2000-265526, Mizuno et al., Sep. 26, 2001.*

* cited by examiner

*Primary Examiner*—Robert Dawson
*Assistant Examiner*—Christopher Keehan
(74) *Attorney, Agent, or Firm*—Wenderoth, Lind & Ponack, L.L.P.

(57) ABSTRACT

A layer comprising a stain resistant agent is formed on a treated surface of a ceramic product used with water so that a stain resistant treatment is applied to the treated surface. The stain resistant agent includes a silicon-containing functional group combining with the hydroxyl group present on the treated surface by dehydration or dehydrogenation. Consequently, a high stain resistant effect can be achieved from the ceramic product.

22 Claims, 11 Drawing Sheets

FIG. 4 (A)    (B)
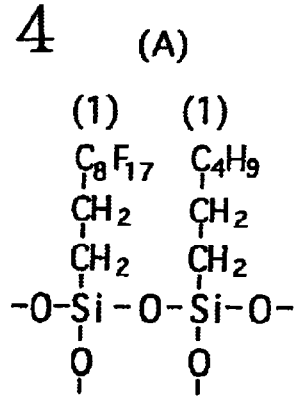 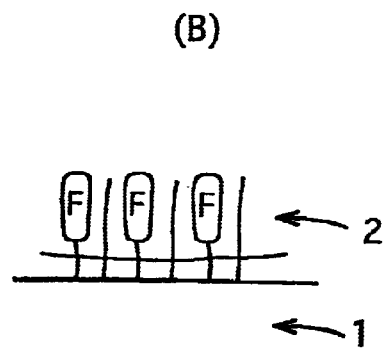
FIG. 5 (A)    (B)
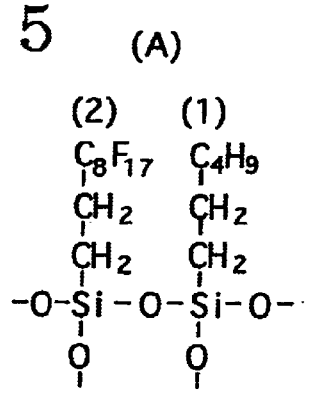 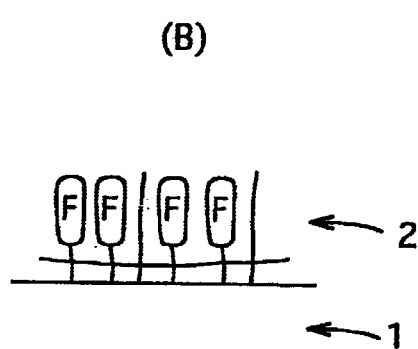
FIG. 6 (A)    (B)
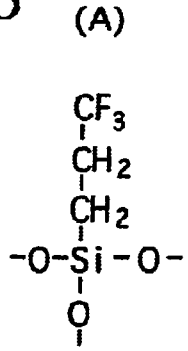 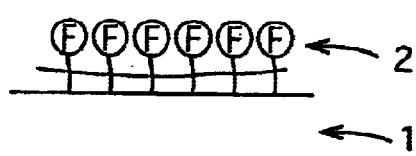

FIG. 7   (A)                (B)
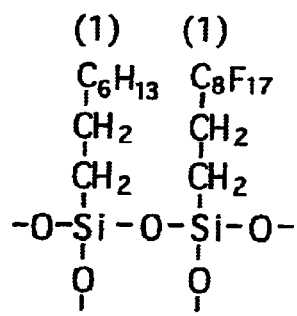
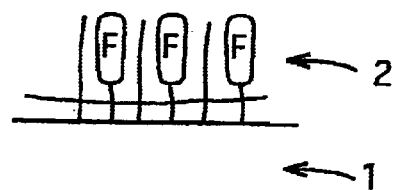
FIG. 8   (A)                (B)
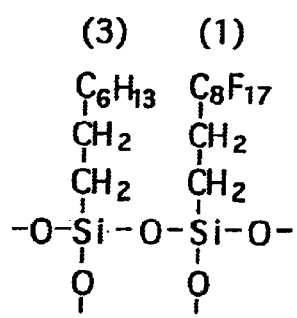
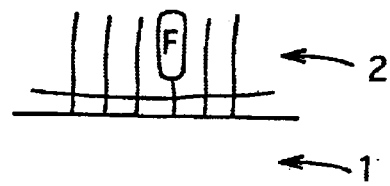
FIG. 9   (A)                (B)
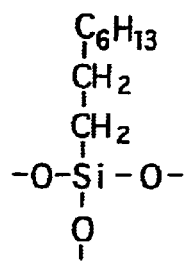
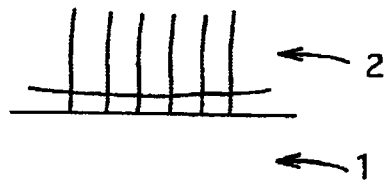

CERAMIC PRODUCT TO BE USED AROUND WATER AND METHOD OF ANTIFOULING TREATMENT THEREFOR

TECHNICAL FIELD

The present invention relates to a ceramic product used in a place where water is used, for example, in a toilet, kitchen or lavatory in a house. Such a ceramic product includes flush toilets, wash basins, etc. The invention further relates to a method of stain resistant treatment applied to the ceramic product.

BACKGROUND ART

Ceramic products such as flush toilets come into contact with human waste, aqueous solution of soap, cleansing liquid, shampoo, lipstick, hairdye, etc. as well as with water in their use. In view of this, a vitreous glazed layer is formed on an inner surface etc. of the ceramic product so that stain such as human waste can easily be eliminated. Furthermore, an antibacterial treatment causing an oligodynamic reaction has recently been applied to the glazed layer for prevention of production of slime and urinary calculus resulting from these stains. Furthermore, the human waste, soap liquid, cleansing liquid, shampoo, hairdye, etc. are aqueous. These adhere to the inner surface of the ceramic product together with water and thereafter dry into stain. In view of this, a water repellent treatment is applied to a glazed surface so that these materials are prevented from remaining on the glazed surface.

DISCLOSURE OF THE INVENTION

However, results of experiments conducted by the inventors that the stain of the ceramic products is a combination of a hydroxyl group present on the glazed surface with components of the human waste etc. and not the dried human waste etc. remaining on the glazed surface. The combination of the hydroxyl group with the components of the human waste etc. is made via dehydration or dehydrogenation between the hydroxyl and metal ion in water. of such metal ions, soluble silica is particularly considered to be deposited as silicic acid with network structure or silicic scale and apt to incorporate stain.

According to results of investigation carried out by the inventors, service waters and mineral waters which are obtained all over Japan and are generally considered to contain no stain actually each contain about 10 p.p.m. of soluble silica on the average as shown by p.p.m. in the following TABLES 1 to 4.

TABLE 1

| No. | Classification | Maximum | Minimum | Average |
|---|---|---|---|---|
| 1 | Service water | 23 | 12 | 16 |
| 2 | Service water | 17 | 12 | 15 |
| 3 | Service water | 16 | 12 | 14 |
| 4 | Service water | 20 | 18 | 19 |
| 5 | Service water | 25 | 18 | 21 |
| 6 | Service water | | | 16.4 |
| 7 | Service water | | | 38.7 |
| 8 | Mineral water | | | 42.7 |
| 9 | Mineral water | | | 24.7 |
| 10 | Service water | 19 | 15 | 17 |
| 11 | Service water | 18 | 15 | 17 |
| 12 | Service water | 24 | 19 | 22 |
| 13 | Mineral Water | 12.3 | 7.8 | 10.5 |

TABLE 1-continued

| No. | Classification | Maximum | Minimum | Average |
|---|---|---|---|---|
| 14 | Mineral water | | | 15.3 |
| 15 | Service water | | | 21 |
| 16 | Service water | | | 23 |
| 17 | Service water | | | 14 |
| 18 | Service water | | | 23 |
| 19 | Service water | | | 23 |
| 20 | Service water | | | 21 |
| 21 | Service water | | | 14 |
| 22 | Service water | | | 20 |
| 23 | Service water | | | 16 |

TABLE 2

| No. | Classification | Maximum | Minimum | Average |
|---|---|---|---|---|
| 24 | Service water | | | 20 |
| 25 | Service water | 17 | 9 | 12 |
| 26 | Service water | 17 | 9 | 12 |
| 27 | Service water | 26 | 24 | 25 |
| 28 | Service water | 22 | 19 | 20 |
| 29 | Service water | 21 | 13 | 18 |
| 30 | Service water | 20 | 15 | 16 |
| 31 | Mineral water | | | 32 |
| 32 | Service water | 30 | 25 | 27.5 |
| 33 | Service water | 29.3 | 24 | 26.7 |
| 34 | Service water | 28.1 | 21.7 | 25 |
| 35 | Service water | 24 | 20 | 21 |
| 36 | Service water | 22 | 16 | 20 |
| 37 | Mineral water | | | 28.7 |
| 38 | Mineral water | | | 26.9 |
| 39 | Mineral water | 15.7 | 11.5 | 13.6 |
| 40 | Mineral water | | | 21.9 |
| 41 | Mineral water | | | 5.6 |
| 42 | Mineral water | | | 16 |
| 43 | Mineral water | | | 21.4 |
| 44 | Mineral water | | | 15 |
| 45 | Mineral water | | | 35.1 |
| 46 | Service water | 11 | 10 | 11 |

TABLE 3

| No. | Classification | Maximum | Minimum | Average |
|---|---|---|---|---|
| 47 | Service water | 11 | 10 | 11 |
| 48 | Service water | 11 | 10 | 11 |
| 49 | Service water | 11 | 11 | 11 |
| 50 | Mineral water | | | 50.1 |
| 51 | Service water | | | 14 |
| 52 | Service water | | | 11.4 |
| 53 | Mineral water | | | 13.5 |
| 54 | Mineral water | | | 25 |
| 55 | Mineral water | | | 28.2 |
| 56 | Mineral water | | | 22.6 |
| 57 | Mineral water | | | 18.6 |
| 58 | Mineral water | | | 10.7 |
| 59 | Service water | 17.2 | 10.1 | 13.9 |
| 60 | Service water | 17 | 10.9 | 14.1 |
| 61 | Service water | 22 | 10 | 16 |
| 62 | Service water | 12 | 9 | 11 |
| 63 | Mineral water | | | 7.1 |
| 64 | Service water | 15.3 | 12.9 | 14.1 |
| 65 | Service water | 18.1 | 13.3 | 15 |
| 66 | Service water | 31 | 21.6 | 26 |
| 67 | Service water | 27 | 7.8 | 12.3 |
| 68 | Service water | 15.4 | 13.5 | 14.7 |
| 69 | Service water | 35.6 | 22.8 | 29.2 |

TABLE 4

| No. | Classification | Maximum | Minimum | Average |
|---|---|---|---|---|
| 70 | Mineral water | | | 54.2 |
| 71 | Mineral water | 67.2 | 52.2 | 64.2 |
| 72 | Service water | 59.3 | 55.3 | 57.2 |
| 73 | Service water | 62.6 | 57.4 | 59.4 |
| 74 | Service water | 56.4 | 51.2 | 53.2 |
| 75 | Service water | 56.6 | 53.4 | 54.7 |
| 76 | Service water | 57.8 | 53.1 | 54.9 |
| 77 | Mineral water | | | 43.4 |
| 78 | Mineral water | | | 55. 9 |
| 79 | Mineral water | | | 50.3 |
| 80 | Service water | 108 | 11 | 62 |
| 81 | Mineral water | | | 5.3 |

The aforesaid ceramic product is used with water containing a large quantity of the metal ion such as soluble silica, stain such as human waste is apt to adhere to the ceramic product. It is difficult to clean the ceramic product.

The present invention has been made in view of the foregoing and an object thereof is to provide a ceramic product which is subjected to water in use and which has a high stain preventive effect and a method of stain resistant treatment applied to the ceramic product.

To solve the aforesaid problem, the present invention provides a ceramic product having a treated surface formed with a layer composed of a stain resistant agent, said agent including a silicon-containing functional group combining with a hydroxyl group present on the treated surface by dehydration or dehydrogenation.

The invention also provides a method of stain resistant treatment applied to a ceramic product used with water and having a treated surface on which a layer comprising a stain resistant agent is formed so that a stain resistant treatment is applied to the ceramic product, the stain resistant agent including a silicon-containing functional group combining with a hydroxyl group present on the treated surface by dehydration or dehydrogenation.

In the present invention, the stain resistant agent contains the silicon-containing functional group (X—Si—O—) which combines by the dehydration or dehydrogenation with the hydroxyl group (—OH) present on the treated surface such as a glazed surface, thereby shielding the hydroxyl group. Accordingly, even when used water contains a large quantity of metal ion such as soluble silica, the hydroxyl group is already disabled or ineffective such that the hydroxyl group does not combine with any metal ion and accordingly with any component of human waste etc. Particularly even when used water contains soluble silica as the metal ion, the soluble silica is not deposited or is not apt to be deposited as silicic acid with network structure such that stain is not apt to be incorporated. Thus, if the stain resistant agent has the silicon-containing functional group, stain such as human waste is prevented from adhering to the ceramic product even when the ceramic product is used with water containing a large quantity of metal ion such as soluble silica, whereupon the ceramic product can easily be cleaned.

The silicon-containing functional group does not preferably combine with another silicon-containing functional group. According to the results of experiments conducted by the inventors, high scale, hairdye, wear and alkali resistances can be achieved. If the silicon-containing functional groups of the stain resistant agent combine with each other, silica is increased such that silicic acid with the network structure is deposited on the layer. Stain can be considered to be incorporated with the silicic acid.

Additionally, the silicon-containing functional group of the stain resistant agent has a durability as high as silica in the glazed surface of the ceramic product.

The stain resistant agent preferably contains a terminal carbon fluoride group combining with the silicon-containing functional group. Results of experiments conducted by the inventors show that the stain resistance also appears as water repellency by a small critical surface tension of the carbon fluoride group. Consequently, high scale, hairdye, wear and alkali resistances can be achieved.

The carbon fluoride group is preferably —$C_nF_{2n+1}$ where n is a natural number in a range of $1 \leq n \leq 12$. Results of experiments conducted by the inventors show that this increases fluoride and accordingly fluorosilane. Consequently, high scale, hairdye, wear and alkali resistances can be achieved.

The stain resistant agent preferably contains a terminal alkyl group combining with the silicon-containing functional group. Results of experiments conducted by the inventors show that the stain resistance also appears as lipstick stain and alkali resistances by a small critical surface tension of the alkyl group.

The stain resistant agent does not preferably contain any terminal alkali group combining with the silicon-containing functional group. Results of experiments conducted by the inventors show that this can achieve large scale, hairdye, wear and alkali resistances.

From the viewpoint of the wear resistance, a methyl group may be employed as the alkyl group. On the other hand, a propyl or hexyl group may be employed as the alkyl group from the viewpoint of alkali. Results of experiments conducted by the inventors show that when the alkyl group is a propyl or hexyl group, the alkyl group is increased. The stain resistant agent is advantageous in the alkali resistance but disadvantageous in the wear resistance. On the other hand, when the alkyl group is a methyl group, the stain resistant agent is advantageous in the wear resistance but disadvantageous in the alkali resistance.

The number of alkyl groups is perferably larger than the number of carbon fluoride groups when the stain resistant agent contains a terminal carbon fluoride group combining with the silicon-containing functional group and a terminal alkyl group combining with said silicon-containing functional group. Results of experiments conducted by the inventors show that the stain resistant agent does not contain only perfluoloalkylsilane. Consequently, the stain resistant agent has high lipstick stain wear resistances.

On the other hand, the number of carbon fluoride groups is preferably larger than the number of alkyl groups when the stain resistant agent contains a terminal carbon fluoride group combining with the silicon-containing functional group and a terminal alkyl group combining with said silicon-containing functional group. Results of experiments conducted by the inventors show that this increases perfluoloalkylsilane, resulting in high scale, hairdye, wear and alkali resistances.

The silicon-containing functional group and the alkyl group are preferably combined with each other by dimethyl siloxane (O—$Si(CH_3)_2$). Results of experiments conducted by the inventors show that this results in high scale, hairdye, wear and alkali resistances.

The dimethyl siloxane preferably contains a straight chain combination of a silicon-containing functional group and an alkyl group or an annular combination of the silicon-containing functional group and the alkyl group. Results of experiments conducted by the inventors show that this results in stably high scale, hairdye, wear and alkali resistances.

As one example of the straight chain combination of the silicon-containing functional group and the alkyl group, an stain resistant agent containing a mixture of a first agent and a second agent described in Japanese Patent Application Publication No. 8-209118 (1996) may be employed. The first agent is a co-hydrolysate of an organic silicon compound containing a perphloroalkyl group and a methylpolysiloxane compound containing a hydrolytic group in a hydrophilic solvent, whereas the second agent is a mixture of organopolysiloxane and a strong acid. More specifically, the first agent is a co-hydrolysate of $C_8F_{17}CH_2CH_2Si(OCH_3)_3$ and $Si(CH_3O)_3CH_2CH_2—(Si(CH_3)_2O)_{10}—Si(CH_3)_2CH_2CH_2Si(OCH_3)_3$ in a hydrophilic solvent containing a solution of 0.1 N-hydrochloric acid, t-butanol and hexane. The second agent is a mixture of $HO—(Si(CH_3)_2O)_{30}—Si(CH_3)_2OH$ and methanesulfonic acid.

A large effect can be achieved in a case where the treated surface is repeatedly wetted and dried. In a portion repeatedly wetted and dried, a metal ion in the water easily combines with a hydroxyl group, whereupon stain tends to be produced. In this meaning, the ceramic product of the present invention is effective when it is a Western style flush toilet, a Japanese style flush toilet, a flush toilet for men or a basin.

An antibacterial treatment may be applied to portions other than the treated surface.

When the stain resistant treatment of the present invention is applied to a treated surface which has already been stained, a ceramic product to which no stain resistant treatment has been applied can be changed to a treated ceramic product, or the reduced stain resistant effect of the ceramic product can be improved.

The method preferably comprises a pretreatment step of reproducing a hydroxyl group on the treated surface. Consequently, the layer can exhibit high durability. As the pretreatment step, the treated surface may be rubbed using an abrasive or acid ammonium fluoride or hydrofluoric acid may be applied to the treated surface and thereafter, the treated surface may be washed in order that stain due to silicic acid (stain due to scale) may be eliminated. Furthermore, the pretreatment step may include a first step where the treated surface is washed with an acid liquid so that stain due to urine is eliminated and a second step where the treated surface is rubbed using an abrasive subsequent to the first step, or acid ammonium fluoride or hydrofluoric acid is applied to the treated surface and thereafter, the treated surface is washed so that stain due to silicic acid (stain due to scale) is eliminated.

BRIEF DESCRIPTION OF THE DRAWINGS

Other objects, features add advantages of the present invention will become clear upon reviewing the following description of the preferred embodiments, made with reference to the accompanying drawings, in which:

FIGS. 4A and 4B show a chemical formula of a stain resistant agent and a schematic structure of a layer comprising the stain resistant agent concerning test 4 respectively;

FIGS. 5A and 5B show a chemical formula of a stain resistant agent and a schematic structure of a layer comprising the stain resistant agent concerning test 5 respectively;

FIGS. 6A and 6B show a chemical formula of a stain resistant agent and a schematic structure of a layer comprising the stain resistant agent concerning test 6 respectively;

FIGS. 7A and 7B show a chemical formula of a stain resistant agent and a schematic structure of a layer comprising the strain resistant agent concerning test 7 respectively;

FIGS. 8A and 8B show a chemical formula of a stain resistant agent and a schematic structure of a layer comprising the strain resistant agent concerning test 8 respectively;

FIGS. 9A and 9B show a chemical formula of a stain resistant agent and a schematic structure of a layer comprising the strain resistant agent concerning test 9 respectively;

BEST MODE FOR ENFORCEMENT OF THE INVENTION

Test Examples and Evaluation

Test examples 1 to 15 and their evaluation will first be described.

Test Example 1

A ceramic product which is used with water and has a glazed layer on a surface thereof is first prepared. The ceramic product is, for example, a flush toilet or basin. A treated surface of the ceramic product such as an inner surface thereof is cleaned with ethanol.

Further, a mixture of first and second agents mixed at a weight ratio ranging between 1:1 and 5:1 is prepared as a stain resistant agent. The weight ratio is selected depending upon the first and second agents.

Concerning the first agent, $C_8F_{17}CH_2CH_2Si(OCH_3)_3$ is prepared as an organic silicon compound containing a perfluoloalkyl group and $Si(CH_3O)_3CH_2CH_2\text{—}(Si(CH_3)_2O)_{10}\text{—}Si(CH_3)_2CH_2CH_2Si(OCH_3)_3$ is prepared as a methylpolysiloxane compound containing a hydrolytic group. The first agent is a co-hydrolysate of them in a hydrophilic solvent containing a solution of 0.1 N-hydrochloric acid, t-butanol and hexane. As a result, each of $C_8F_{17}CH_2CH_2Si(OCH_3)_3$ and $Si(CH_3O)_3CH_2CH_2\text{—}(Si(CH_3)_2O)_{10}\text{—}(Si(CH_3)_2CH_2CH_2Si(OCH_3)_3$ is considered to contain a silanol (Si—OH) group.

On the other hand, the second agent is a mixture of organopolysiloxane $(HO\text{—}(Si(CH_3)_2O)_{30}\text{—}Si(CH_3)_2OH)$ and methanesulfonic acid as a strong acid.

When these first and second agents are mixed together, the silanol group as the co-hydrolysate reacts on organopolysiloxane and the strong acid so as to result in a siloxane combination (Si—O—Si) due to dehydration, whereby the silanol group is considered to become an addition compound in which a plurality of molecules are twined complicatedly. Accordingly, the stain resistant agent containing the mixture of the first and second agents is not composed of a single molecule of an organic silicon compound containing a perfluoloalkyl group, a methylpolysiloxane compound containing ahydrolytic group, organopolysiloxane, etc. but is considered to be composed into an addition compound in which a plurality of these molecules are twined complicatedly or a kind of polymer, as shown in FIG. 1A.

The aforesaid stain resistant agent is permeated into tissue paper or unwoven cloth so that the treated surface is rubbed with the tissue paper etc. about ten times, whereby the stain resistant agent is applied to the treated surface. The stain resistant agent applied to the treated surface is dried about ten minutes such that the silanol group of the addition compound and the silanol group on the surface of the ceramic product are combined with each other by siloxane (Si—O—Si) by means of dehydration. As a result, the addition compound and the treated surface of the ceramic product are strongly combined together. Thereafter, the stain resistant agent which has not reacted yet to remain on the treated surface is eliminated with ethanol.

Figure 1:
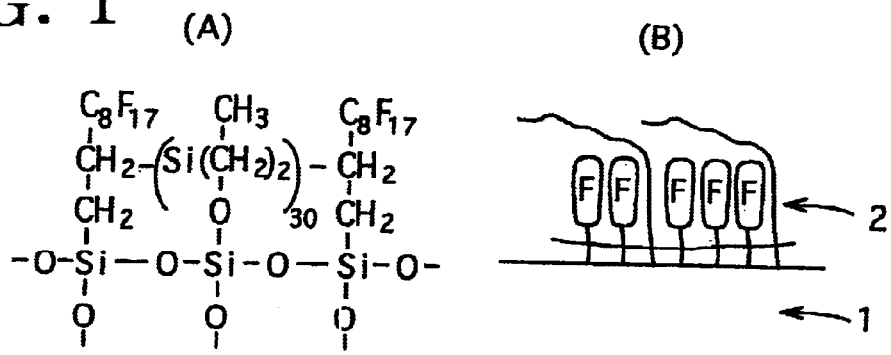
FIGS. 1A and 1B show a chemical formula of a stain resistant agent and a schematic structure of a layer comprising the stain resistant agent concerning test 1 respectively.

Thus, a layer comprising the stain resistant agent 2 is formed on the treated surface of the ceramic product 1 so that a stain resistant treatment is applied to the treated surface, as shown in FIG. 1B.

Test Example 2

Figure 2:
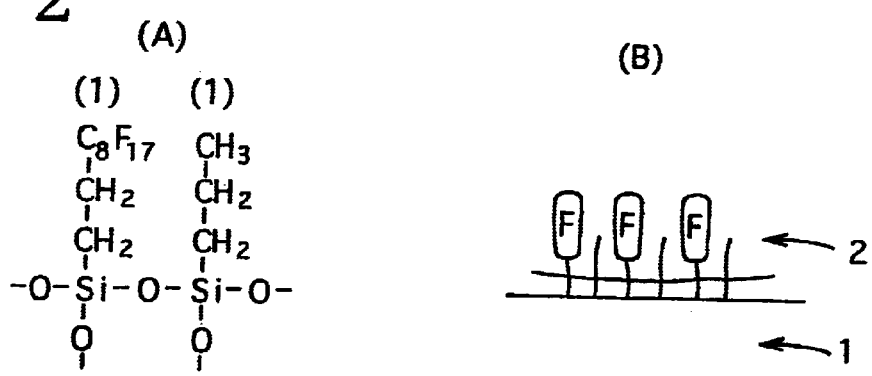
FIGS. 2A and 2B show a chemical formula of a stain resistant agent and a schematic structure of a layer comprising the stain resistant agent concerning test 2 respectively.

A stain resistant agent 2 as shown in FIG. 2A is employed and a layer comprising the stain resistant agent 2 is formed on the treated surface of the ceramic product 1 as shown in FIG. 2B. Parenthesized numerals in FIG. 2A designate ratios of groups of $C_8H_{17}$ and $CH_3$. The following is the same. The other condition in the test example 2 is the same as that in the first test example.

Test Example 3

Figure 3:
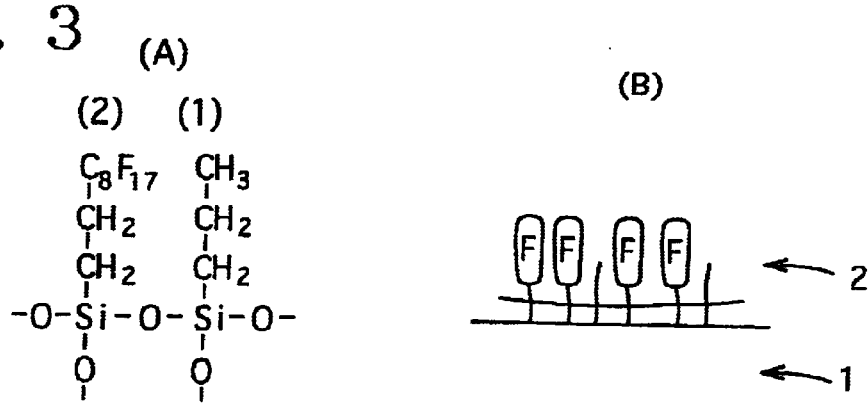
FIGS. 3A and 3B show a chemical formula of a stain resistant agent and a schematic structure of a layer comprising the stain resistant agent concerning test 3 respectively.

A stain resistant agent 2 as shown in FIG. 3A is employed and a layer comprising the stain resistant agent 2 is formed on the treated surface of the ceramic product 1 as shown in FIG. 3B. The other condition in the third test example is the same as that in the first test example.

Test Example 4

A stain resistant agent 2 as shown in FIG. 4A is employed and a layer comprising the stain resistant agent 2 is formed on the treated surface of the ceramic product 1 as shown in FIG. 4B. The other condition in the fourth test example is the same as that in the first test example.

Test Example 5

A stain resistant agent 2 as shown in FIG. 5A is employed and a layer comprising the stain resistant agent 2 is formed on the treated surface of the ceramic product 1 as shown in FIG. 5B. The other condition in the fifth test examples the same as that in the first test example.

Test Example 6

A stain resistant agent 2 as shown in FIG. 6A is employed and a layer comprising the stain resistant agent 2 is formed on the treated surface of the ceramic product 1 as shown in FIG. 6B. The other condition in the sixth test example is the same as that in the first test example.

Test Example 7

A stain resistant agent 2 as shown in FIG. 7A is employed and a layer comprising the stain resistant agent 2 is formed on the treated surface of the ceramic product 1 as shown in FIG. 7B. The other condition in the seventh test example is the same as that in the first test example.

Test Example 8

A stain resistant agent 2 as shown in FIG. 8A is employed and a layer comprising the stain resistant agent 2 is formed on the treated surface of the ceramic product 1 as shown in FIG. 8B. The other condition in the eighth test example is the same as that in the first test example.

Test example 9

A stain resistant agent 2 as shown in FIG. 9A is employed and a layer comprising the stain resistant agent 2 is formed on the treated surface of the ceramic product 1 as shown in FIG. 9B. The other condition in the ninth test example is the same as that in the first test example.

Test Example 10

Figure 10:
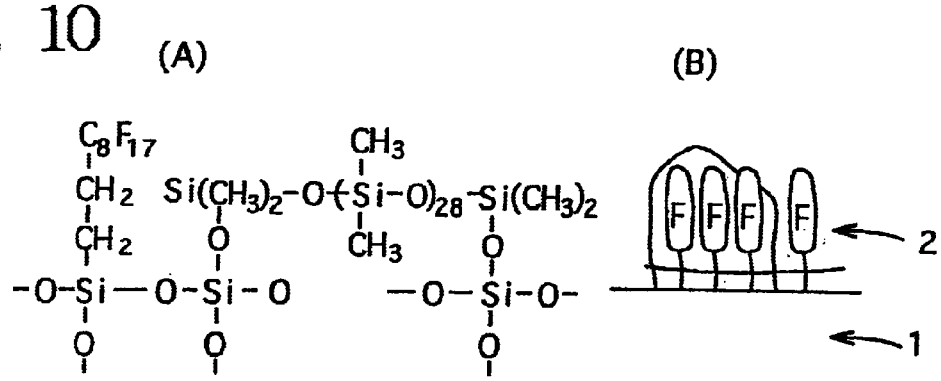
FIGS. 10A and 10B show a chemical formula of a stain resistant agent and a schematic structure of a layer comprising the strain resistant agent concerning test 10 respectively.

Two stain resistant agents 2 as shown in FIG. 10A are employed and a layer comprising the stain resistant agent 2 is formed on the treated surface of the ceramic product 1 as shown in FIG. 10B. The other condition in the tenth test example is the same as that in the first test example.

Test Example 11

Figure 11:
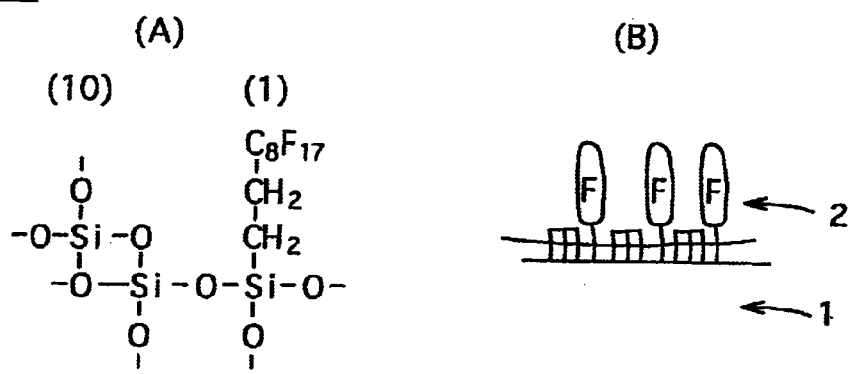
FIGS. 11A and 11B show a chemical formula of a stain resistant agent and a schematic structure of a layer comprising the strain resistant agent concerning test 11 respectively.

A stain resistant agent 2 as shown in FIG. 11A is employed and a layer comprising the stain resistant agent 2 is formed on the treated surface of the ceramic product 1 as shown in FIG. 11B. The other condition in the eleventh test example is the same as that in the first test example.

Test Example 12

Figure 12:
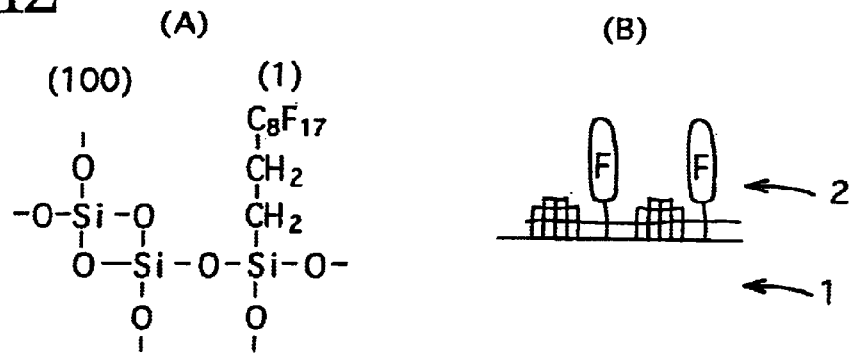
FIGS. 12A and 12B show a chemical formula of a stain resistant agent and a schematic structure of a layer comprising the strain resistant agent concerning test 12 respectively.

A stain resistant agent 2 as shown in FIG. 12A is employed and a layer comprising the stain resistant agent 2 is formed on the treated surface of the ceramic product 1 as shown in FIG. 12B. The other condition in the twelfth test example is the same as that in the first test example.

Test Example 13

Figure 13:
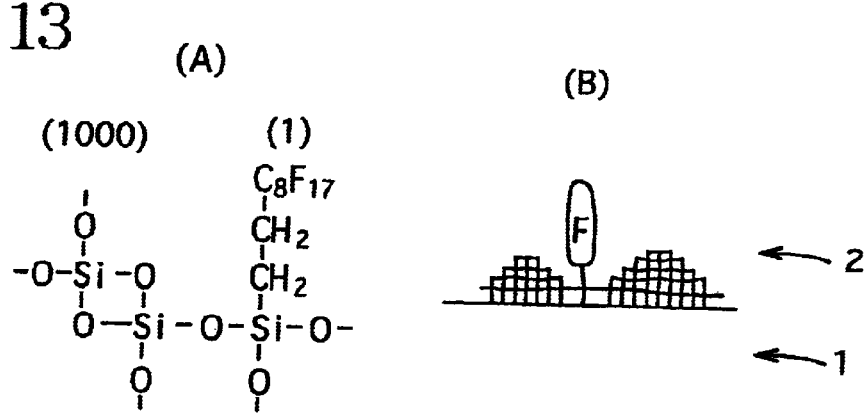
FIGS. 13A and 13B show a chemical formula of a stain resistant agent and a schematic structure of a layer comprising the strain resistant agent concerning test 13 respectively.

A stain resistant agent 2 as shown in FIG. 13A is employed and a layer comprising the stain resistant agent 2 is formed on the treated surface of the ceramic product 1 as shown in FIG. 13B. The other condition in the thirteenth test example is the same as that in the first test example.

Test Example 14

Figure 14:
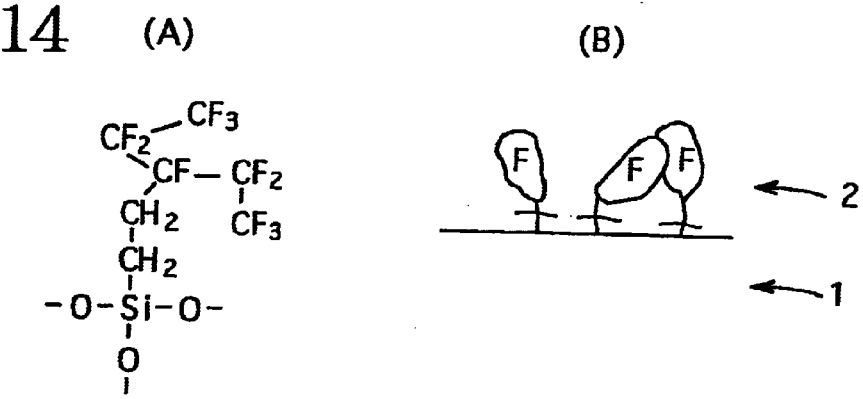
FIGS. 14A and 14B show a chemical formula of a stain resistant agent and a schematic structure of a layer comprising the strain resistant agent concerning test 14 respectively.

A stain resistant agent 2 as shown in FIG. 14A is employed and a layer comprising the stain resistant agent 2 is formed on the treated surface of the ceramic product 1 as shown in FIG. 14B. The other condition in the fourteenth test example is the same as that in the first test example.

Test Example 15

Figure 15:
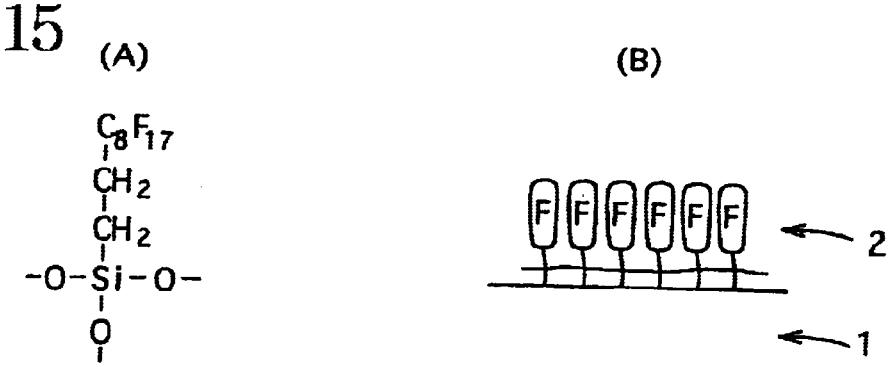
FIGS. 15A and 15B show a chemical formula of a stain resistant agent and a schematic structure of a layer comprising the strain resistant agent concerning test 15 respectively.

A stain resistant agent 2 as shown in FIG. 15A is employed and a layer comprising the stain resistant agent 2 is formed on the treated surface of the ceramic product 1 as shown in FIG. 15B. The other condition in the fifteenth test example is the same as that in the first test example.

Evaluation

The following tests were carried out for the aforesaid ceramic products of test examples 1 to 15 and an untreated ceramic product. The tests included scale, lipstick, hairdye, wear and alkali resistance tests as following.

Scale Resistance Test

An aqueous solution containing 200 p.p.m. sodium silicate was prepared, so that the glazed layers of the respective products were immersed in the solution at 70° C. for three hours. Thereafter, silicic acid deposited on a water reserving surface serving as a boundary of a water reserving portion was colored by a coloring agent. The ceramic products were evaluated by visual observation. Symbol "◯" designates a best product, symbol "Δ" a slightly better product, and symbol "×" a worst product.

Lipstick Resistance Test

A commercially available oily lipstick was applied to the glazed surface of each product. Each product was left for 48 hours and thereafter, the applied lipstick was wiped away. The ceramic products were evaluated by visual observation. Symbol "◯" designates a best product, symbol "Δ" a slightly better product, and symbol "×" a worst product.

Hairdye Resistance Test

A commercially available liquid hairdye was applied to the glazed surface of each product. Each product was left for 48 hours and thereafter, the applied hairdye was wiped away. The ceramic products were evaluated by visual observation. Symbol "◯" designates a best product, symbol "Δ" a slightly better product, and symbol "×" a worst product.

Wear Resistance Test

A piece of gauze was held against the glazed layer of each product with a load of about 17 g/cm$^2$ being applied thereto. Under this condition, the gauze was moved reciprocally at a speed of 12 round trips per minute 2000 times. Changes in a contact angle (°) of water in degrees were examined.

Alkali Resistance Test

The glazed layer of each ceramic product was immersed in an aqueous solution of 0.05 weight percentage of NaOH for 24 hours and changes in the contact angle of water were examined.

The following TABLE 5 shows the results of the tests.

TABLE 5

|  | Scale | Lipstick | Hairdye | Wear | Alkali |
| --- | --- | --- | --- | --- | --- |
| Untreated | × | ◯ | × | — | — |
| Example 1 | ◯ | Δ | ◯ | −13(108→95) | −17(108→91) |
| Example 2 | Δ | Δ | Δ | −22(107→85) | −3(109→106) |
| Example 3 | Δ | Δ | Δ | −35(106→71) | −15(111→96) |
| Example 4 | × | Δ | Δ | −35(107→72) | −22(112→90) |
| Example 5 | × | Δ | Δ | −47(109→62) | −18(111→93) |
| Example 6 | × | Δ | × | −12(83→71) | −34(82→48) |
| Example 7 | × | Δ | Δ | −12(110→98) | −36(101→65) |
| Example 8 | × | Δ | × | −12(104→92) | −41(104→63) |
| Example 9 | × | Δ | × | −11(106→95) | −37(100→63) |
| Example 10 | ◯ | Δ | ◯ | −12(100→88) | −12(103→91) |
| Example 11 | × | Δ | × | −37(93→56) | −16(101→85) |
| Example 12 | × | Δ | × | −37(80→43) | −47(90→43) |
| Example 13 | × | Δ | × | −50(104→54) | −25(80→55) |
| Example 14 | ◯ | Δ | ◯ | −11(112→101) | −14(113→99) |
| Example 15 | ◯ | × | ◯ | −31(107→76) | −17(107→90) |

As obvious from test examples 1 to 15 in TABLE 5, it is considered that the stain resistant agent 2 contains the silicon-containing functional group which combines by the dehydration with the hydroxyl group present on the treated surface such as the glazed surface, thereby shielding the hydroxyl group. It is further considered that even when used water contains a large quantity of metal ion such as soluble silica, the hydroxyl group is already disabled or ineffective such that the hydroxyl group does not combine with any metal ion. Accordingly, the soluble silica is not deposited or is not apt to be deposited as silicic acid with network structure such that stain is not apt to be incorporated. Thus, when the stain resistant agent has the silicon-containing functional group, stain such as human waste is prevented from adhering to the ceramic product even when the ceramic product is used with water containing a large quantity of metal ion such as soluble silica, whereupon the ceramic product can easily be cleaned. Additionally, the silicon-containing functional group of the stain resistant agent has a durability as high as silica in the glazed surface of the ceramic product.

According to test examples 11 to 13, if the silicon-containing functional groups of the stain resistant agent 2 combine with each other, silica is increased such that silicic acid with the network structure is deposited on the layer. Stain can be considered to be incorporated with the silicic acid. On the other hand, according to test examples 1 to 10, 14 and 15, high scale, hairdye, wear and alkali resistances can be achieved when the used stain resistant agent 2 does not contain the silicon-containing functional group combining with another silicon-containing functional group.

Furthermore, according to test examples 1 to 8 and 10 to 14, when the stain resistant agent 2 preferably contains a terminal carbon fluoride group combining with the silicon-containing functional group, the stain resistance also appears as water repellency by a small critical surface tension of the carbon fluoride group. Consequently, high scale, hairdye, wear and alkali resistances can be achieved. Particularly when the carbon fluoride group is preferably —$C_nF_{2n+1}$ where n is a natural number in a range of $1 \leq n \leq 12$, this increases a percentage content of fluoride and the bulk of fluorosilane is accordingly increased. Consequently, high scale, hairdye, wear and alkali resistances can be achieved. —$C_8F_{17}$ in which n=8 is particularly preferable from the viewpoint of cost.

According to test examples 14 and 15, when the stain resistant agent 2 does not preferably contain a terminal alkyl group combining with the silicon-containing functional group, high scale, hairdye and alkali resistances can be achieved.

On the other hand, according to test examples 1 to 13, when the stain resistant agent 2 contains a terminal alkyl group combining with the silicon-containing functional group, the stain resistance also appears as lipstick and wear resistances by a small critical surface tension of the alkyl group. According to test examples 1 to 3, 6 and 10, a methyl group may be employed as the alkyl group from the view point of the wear resistance. On the other hand, a propyl or hexyl group may be employed as the alkyl group from the view point of alkali. When the alkyl group is a propyl or hexyl group, the bulk of alkyl group is increased. The stain resistant agent is advantageous in the alkali resistance but disadvantageous in the wear resistance. On the other hand, when the alkyl group is a methyl group, the stain resistant agent is advantageous in the wear resistance but disadvantageous in the alkali resistance.

According to test example 8, a quantity of the alkyl group is preferably larger than a quantity of the carbon fluoride group when the stain resistant agent 2 contains a terminal carbon fluoride group combining with the silicon-containing functional group and a terminal alkyl group combining with said silicon-containing functional group. Consequently, since the stain resistant agent does not contain only perfluoloalkylsilane, the stain resistant agent has high lipstick stain and wear resistances.

On the other hand, according to test examples 3 and 5, a quantity of the carbon fluoride group is preferably larger than a quantity of the alkyl group when the stain resistant agent 2 contains a terminal carbon fluoride group combining with the silicon-containing functional group and a terminal alkyl group combining with the silicon-containing functional group. This increases perfluoloalkylsilane, resulting in high scale, hairdye, wear and alkali resistances.

According to test examples 1 and 10, when the silicon-containing functional group and the alkyl group are combined with each other by dimethyl siloxane, this results in high scale, hairdye, wear and alkali resistances. Particularly in test example 1, the dimethyl siloxane contains a straight chain combination of a silicon-containing functional group and an alkyl group, whereas it contains an annular combination of the silicon-containing functional group and the alkyl group in test example 10. Consequently, stably high scale, hairdye, wear and alkali resistances can be achieved.

EMBODIMENTS

Embodiments 1 to 5 of the present invention will now be described.

First Embodiment

Figure 16:
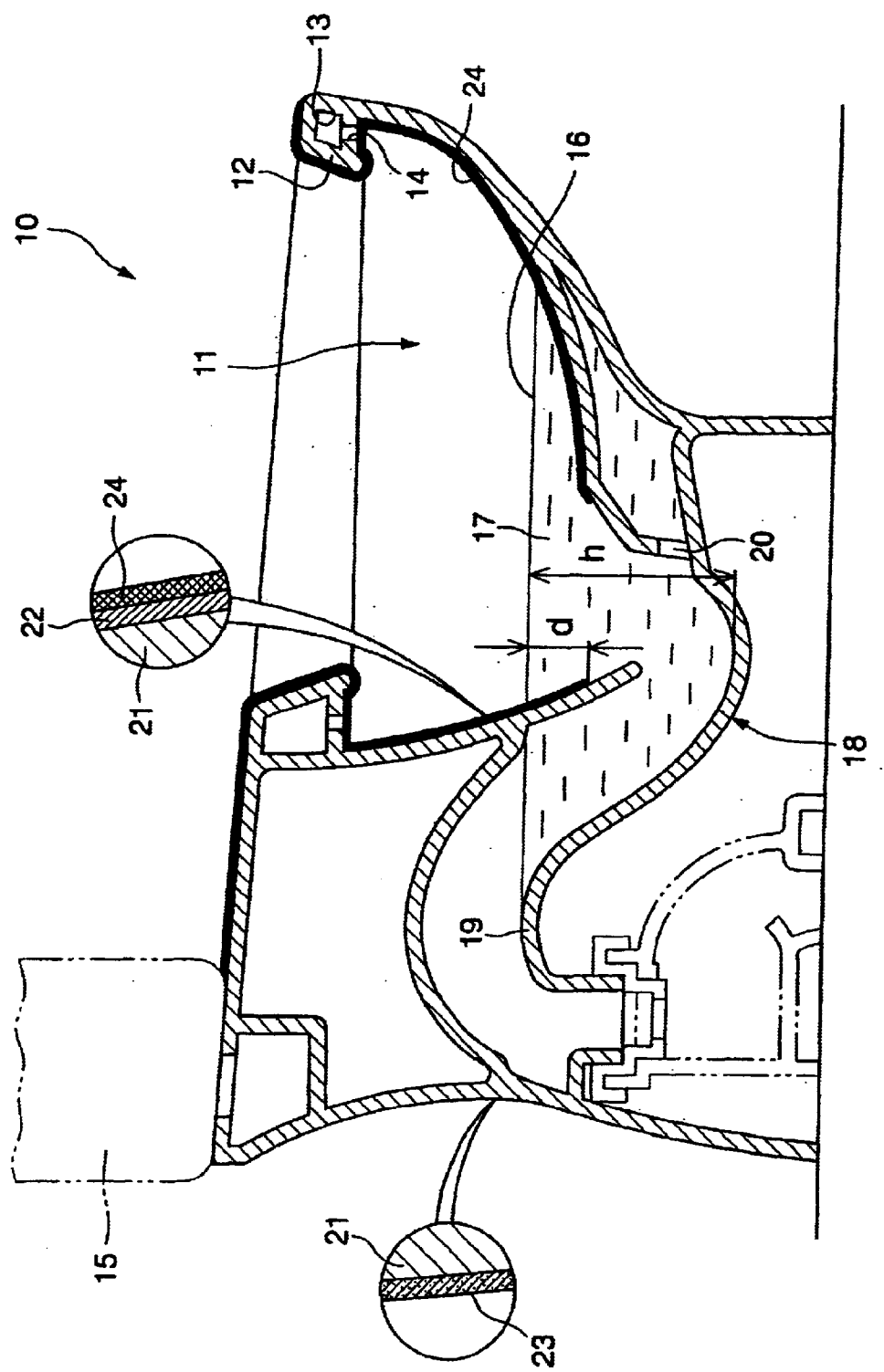
FIG. 16 is a sectional view of a western style flush toilet of a first embodiment in accordance with the present invention.

In a first embodiment, the ceramic product is a Western style flush toilet 10 as shown in FIG. 16.

The flush toilet 10 includes a basin 11 having an annular rim 12 formed on an upper edge thereof. The rim 12 has a water passage 13 through which wash water is fed. The rim 12 has a number of water-jet holes 14 formed at predetermined intervals in the underside thereof. A water tank 15 for reserving the wash water is placed on the rear top of the flush toilet 10. The wash water reserved in the water tank 15 is discharged into the water passage 13 in the rim 12. The wash water is then injected from the water-jet holes 14 toward the inside of the basin 11 so that the inner surface of the basin 11 is cleaned.

The basin 11 includes a lower portion serving as a water reserving portion 17 which reserves the wash water below a water surface 16. The water reserving portion 17 is connected to a drain trap 18. A level h of the wash water reserved in the water reserving portion 17 equals to a height from the bottom of the water reserving portion 17 and an overflow portion 19 of the drain trap 18. The basin 11 has a jet hole 20 which is formed near the bottom of the basin 11 and from which the wash water is injected toward the drain trap 18.

In the flush toilet 10, glazed layers 22 and 23 are formed on a ceramic base 21 thereof except the portion on which the water tank 15 is placed. An antibacterial agent is not dispersed in a part of the glazed layer 22 formed on the inner surface of the basin 11 from the upper end to a depth d (about 3 cm) relative to the water surface 16, a part of the glazed layer 22 formed on the bottom and the inner peripheral surface of the rim 12, and a part of the glazed layer 22 formed on the top of the flush toilet 10 excluding the water tank 15. The antibacterial agent is dispersed in the other part of the glazed layer 23. The antibacterial agent contains silver or silver compound, zinc, copper or a compound of these materials, or a predetermined carrier carrying these materials as well known in the art.

In the flush toilet 10, a surface of the parts of the glazed layer 22 containing no antibacterial agent serves as a treated surface. A layer 24 comprising the stain resistant agent is formed on the treated surface in the same manner as in the aforesaid test example 1. The water level h of the water surface 16 is reduced or increased as the result of evaporation of the wash water. The layer 24 is formed on the inner surface of the basin 11 so as to extend to the depth d (about 3 cm) relative to the water surface 16 so that the layer 24 is located at or below the level of the water surface 16 even when the water surface 16 is lowered most.

In the flush toilet 10 described above, the layer 24 comprising the stain resistant agent is formed on the glazed layer 22 which is wetted by the wash water and dried repeatedly. Accordingly, stain due to combination of a metal ion in the water with a hydroxyl group of the glazed layer 22 can effectively be prevented. The layer 24 is formed particularly on the underside, inner peripheral surface and top of the rim 12. Accordingly, stain on the underside of the rim 12 etc. can effectively be prevented even when the wash water injected from a nozzle of a private parts washer incorporated with the flush toilet 10 splashes to adhere to the underside of the rim 12 etc.

The antibacterial agent is not contained in the glazed layer 22 since the antibacterial agent is easily concealed by the layer 24 such that the antibacterial agent is used wastefully. On the other hand, the layer 24 is formed on the other part of the basin 11 including the bottom of the water reserving portion 17 which is usually located in the water and the drain trap 18 continuous from the bottom of the water reserving portion 17. In these portions, the antibacterial agent is contained in the glazed layer 23. Main stain includes stain due to urine, excrements and organic substances such as bacteria produced and grown with the urine and excrements serving as a nutritive source. These are decomposed by the antibacterial agent within the glazed layer 23.

Second Embodiment

Figure 17:
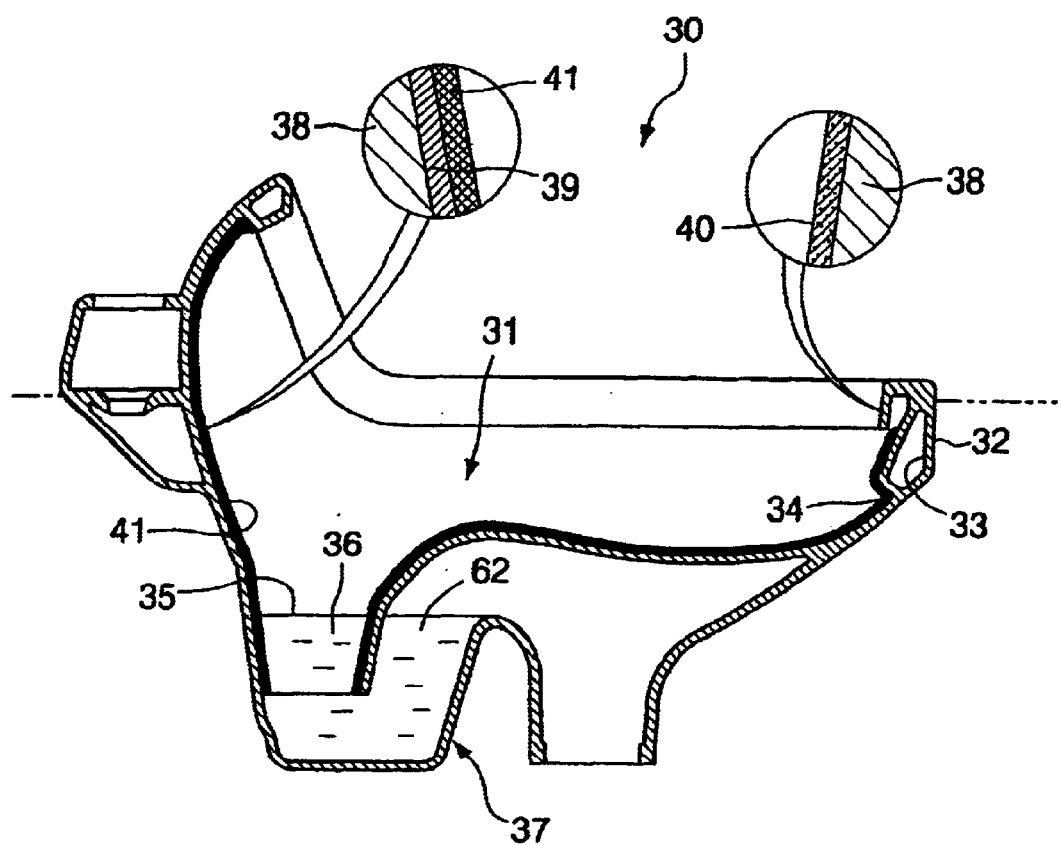
FIG. 17 is a sectional view of a Japanese style flush toilet of a second embodiment in accordance with the invention.

FIG. 17 shows a second embodiment in which the ceramic product is a Japanese style flush toilet 30.

The flush toilet 30 also includes a basin 31 having an annular rim 32 formed on an upper edge thereof except a frontal screen. The rim 32 has a water passage 33 through which wash water is fed. The water passage 33 is connected to a water-supply pipe (not shown) at a front portion of the screen. The rim 32 has a number of water-jet holes 34 formed at predetermined intervals in the rear underside thereof. Wash water supplied from the water-supply pipe is discharged into the water passage 33 in the rim 32. The wash water is then injected from the water-jet holes 34 toward the inside of the basin 31 so that the inner surface of the basin 31 is cleaned. The basin 31 includes a lower portion serving as a water reserving portion 36 which reserves the wash water below a water surface 35. The water reserving portion 36 is connected to a drain trap 37.

In the flush toilet 30, glazed layers 39 and 40 are formed on a ceramic base 38 thereof. The antibacterial agent is not dispersed in a part of the glazed layer 39 formed on the inner surface of the basin 31 except an upper inner edge of the basin. The antibacterial agent is dispersed in the other part of the glazed layer 40. A surface of the parts of the glazed layer 39 containing no antibacterial agent serves as a treated surface. A layer 41 comprising the stain resistant agent is formed on the treated surface in the same manner as in the aforesaid test example 1.

The flush toilet 30 constructed as described above can achieve the same effect as the flush toilet 10 in the first embodiment.

Third Embodiment

Figure 18:
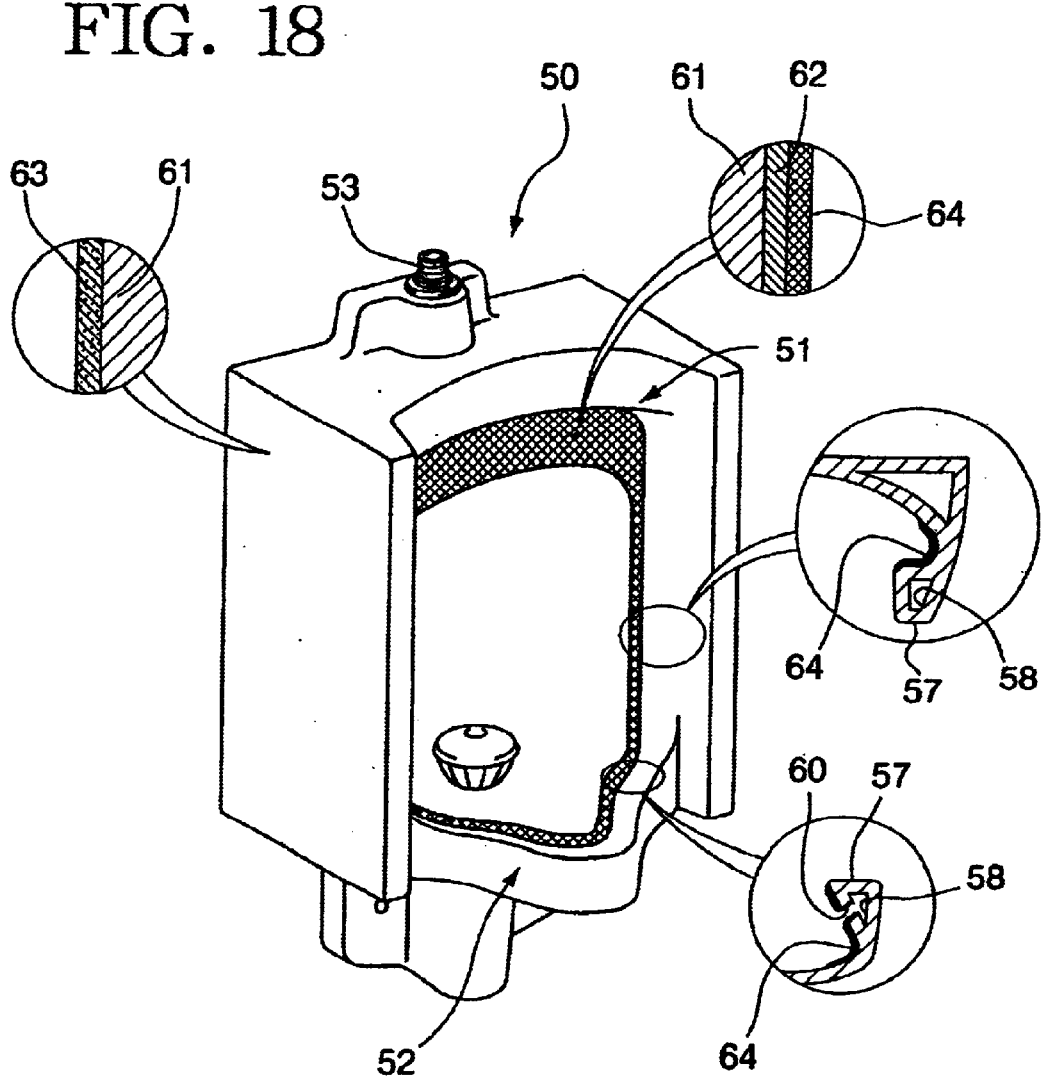
FIG. 18 is a perspective view of a flush toilet for men of a third embodiment in accordance with the invention.
Figure 19:
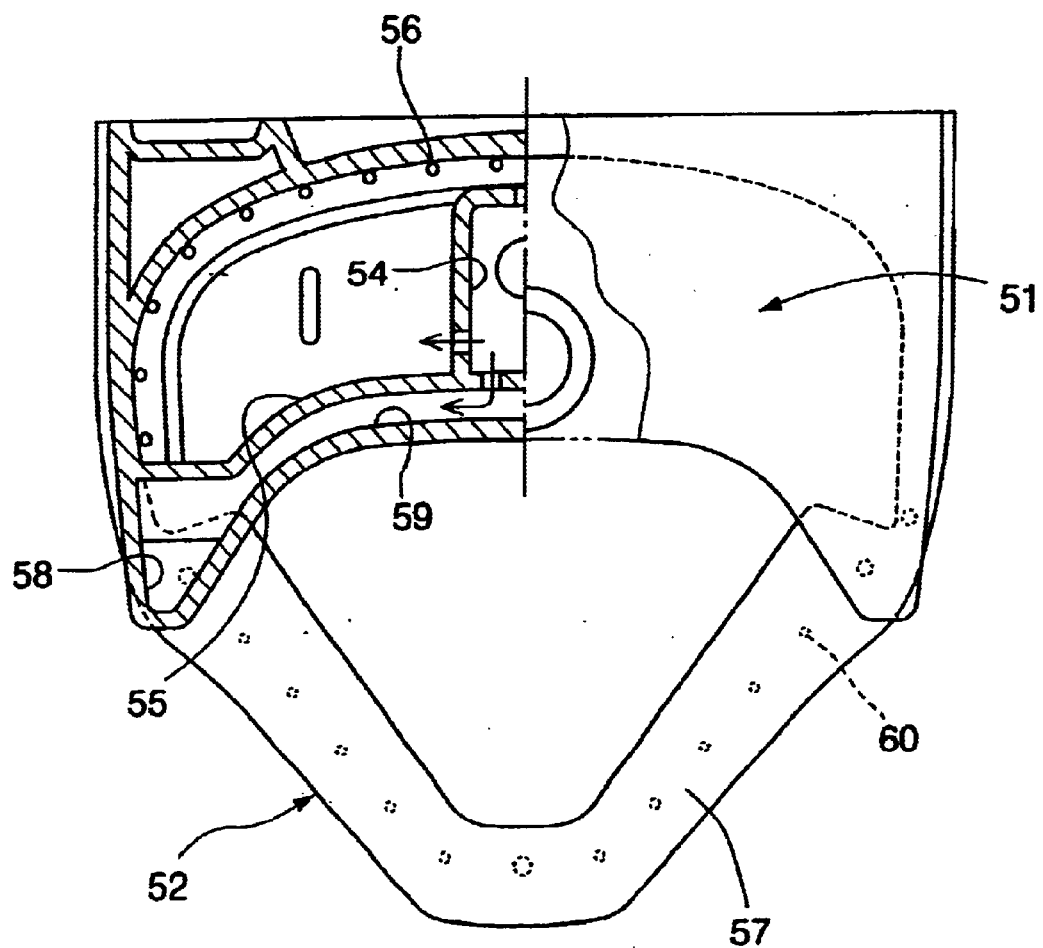
FIG. 19 is a partially broken plan view of the flush toilet for men of the third embodiment.

FIGS. 18 and 19 show a third embodiment in which the ceramic product is a flush water urinal 50 for men.

The urinal 50 includes an upper water injection section 51 and a lower basin 52 formed integrally with the water injection section.

The water injection section 51 includes a water-supply chamber 54 connected via a spud 53 to a water-supply pipe (not shown) and a water-injection chamber 55 communicating with the water-supply chamber 54 as shown in FIG. 19. The water-injection chamber 55 communicates with the basin 52 via a number of water-injection holes 56 formed at predetermined intervals.

The basin 52 has a rim 57 formed on right and left and lower front edges thereof. The rim 57 has a water passage 58 through which wash water is fed. The water injection section 51 is formed with a water passage 59 communicating with the water-supply chamber 54. The water passage 59 also communicates with the water passage 58. The underside of the rim 57 also has a number of water-jet holes 56 formed at predetermined intervals.

Wash water supplied from the water-supply pipe is injected via the water-supply chamber 54 and the water-injection chamber 55 of the water-injection section 51 from the water-jet holes 56 toward the inner surface of the basin 52, so that the inner surface of the basin 52 is washed.

In the urinal 50, glazed layers 62 and 63 are formed on a ceramic base 61 thereof except the rear thereof as shown by hatching in FIG. 18. The antibacterial agent is not dispersed in parts of the glazed layer 62 formed on the upper inner surface of the basin 52 located beneath the water-jet hole 56, formed on right and left ends of the inner surface of the basin 52, and formed on the front lower end of the basin 52. The antibacterial agent is dispersed in the other part of the glazed layer 62. The antibacterial agent contains silver or silver compound, zinc, copper or a compound of these materials, or a predetermined carrier carrying these materials as well known in the art. In the flush water urinal 50, the surface of the parts of the glazed layer 62 containing no antibacterial agent serves as a treated surface. A layer 64 comprising the stain resistant agent is formed on the treated surface in the same manner as in the aforesaid test example 1.

The flush toilet 50 constructed as described above can achieve the same effect as the flush toilet 10 in the first embodiment.

Fourth Embodiment

Figure 20:
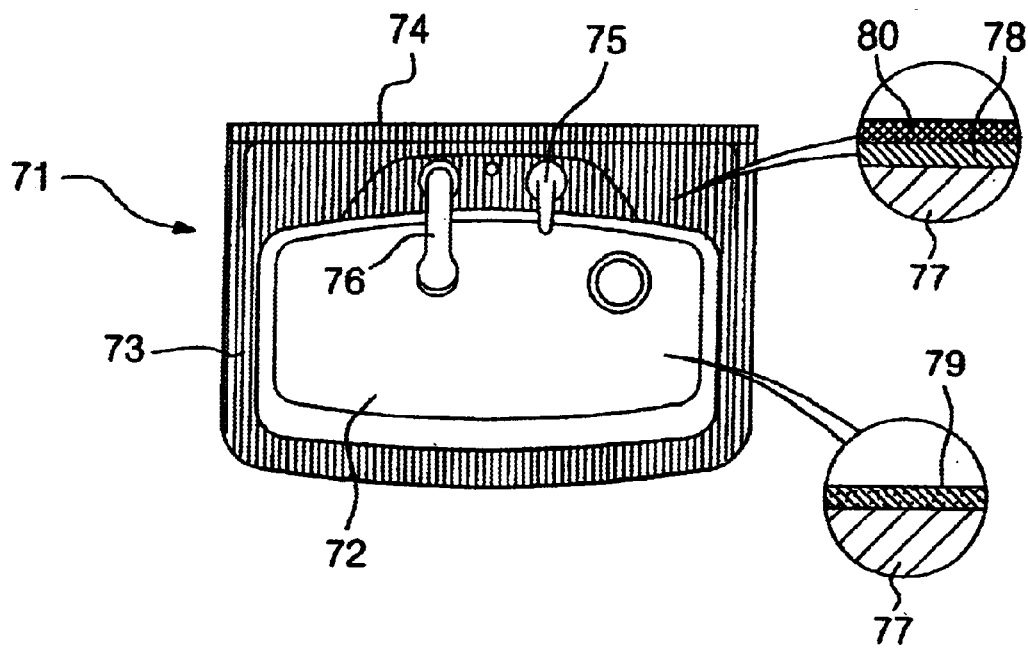
FIG. 20 is a plan view of a lavatory with a washbasin of a fourth embodiment in accordance with the invention.
Figure 21:
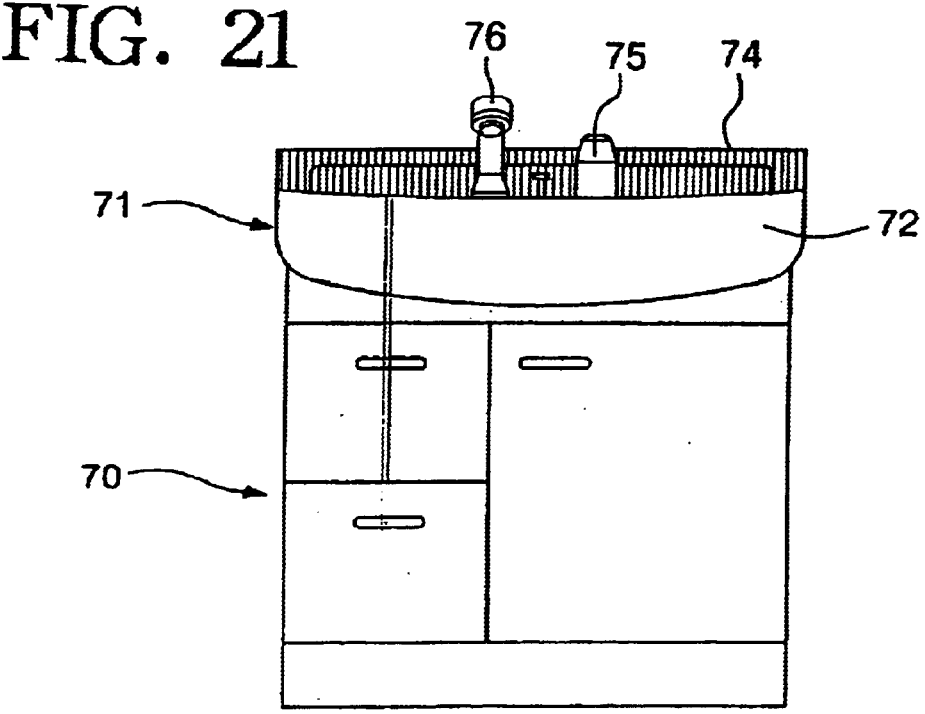
FIG. 21 is a front view of the lavatory with the washbasin of the fourth embodiment.

FIGS. 20 and 21 show a fourth embodiment in which the ceramic product is a water basin 71 The water basin 71 is incorporated with a base cabinet 70, both constituting a washing stand.

The water basin 71 has a generally horizontal flat surface 73 formed around a basin surface 72 and a vertical surface 74 standing at the rear of the flat surface 73. A handle 75 and a faucet 76 are provided on a part of the flat surface 73 at the vertical surface 74 side.

Glazed layers 78 and 79 are formed on a ceramic base 77 of the water basin 71. The antibacterial agent is not dispersed in parts of the glazed layer 78 formed on the flat surface 73 and the vertical surface 74. The antibacterial agent is dispersed in the other part of the glazed layer 79 including the basin surface 72. In the water basin 71, the surface of the glazed layer 78 containing no antibacterial agent serves as a treated surface. A layer 80 comprising the stain resistant agent is formed on the treated surface in the same manner as in the aforesaid test example 1.

The water basin 71 constructed as described above can achieve the same effect as the flush toilet 10 in the first embodiment.

Fifth Embodiment

In a fifth embodiment, the stain resistance treatment is applied to the treated surface of a Western style flush toilet which has already been used such that stain such as silicic acid has adhered to the surface thereof.

First, a preparatory work including removal of a toilet seat from a toilet unit is made and thereafter, a dyeing agent is sprayed onto the treated surface similar to that in the first embodiment so that stain due to silicic acid is confirmed. Subsequently, a pretreatment step for reproducing a hydroxyl group on the treated surface is carried out. The pretreatment step includes a first step in which an acidic liquid comprising an aqueous solution of hydrochloric acid, for example is sprayed onto the treated surface, which is then left for a predetermined period of time, for example, five to ten minutes. As the result of the first step, urinary stain which is calcium stain adherent to the treated surface dissolves in the aqueous solution of hydrochloric acid, breaking away from the treated surface. Thereafter, the treated surface is wiped away with a wet duster. In this case, the treated surface may be polished with a brush made from abrasive-containing nylon (commercial name of "Tinex" produced by Dupont).

The acidic liquid combines with the hydroxyl group on the treated surface such that stain due to silicic acid which cannot be removed by an ordinary cleaning work is eliminated. For this purpose, the pretreatment step further includes a second step in which the treated surface is rubbed with an abrasive containing alumina powder as a main component. In this case, it is effective to firstly rub the treated surface with the abrasive and thereafter polish the treated surface with water resistant sandpaper (#1000). As a result, a silicic acid is reproduced on the treated surface. The dyeing agent is sprayed onto the treated surface again so that whether stain due to silicic acid has been eliminated can be ascertained. After the dyeing agent is washed away, the treated surface is washed with the wash water and wiped away with a wet duster. The treated surface is further wiped away with a dry duster. The wash water is drained from the water reservoir and thereafter, the treated surface is dried with a dryer or the like. The treated surface is then wiped away using an organic solvent such as ethanol. The treated surface is further dried with the dryer so that the organic solvent is volatilized.

After the pretreatment step as described above, a layer comprising the stain resistant agent is formed on the treated surface in the same manner as in the test example 1, whereupon the Western style flush toilet treated for stain resistance is obtained.

The stain resistant effect was compared among the Western style flush toilet of the fifth embodiment, a Western style flush toilet of compared case 1 in which a layer comprising the stain resistant agent is formed on the treated surface without execution of the pretreatment step, and a Western style flush toilet of compared case 2 to which neither pretreatment step nor stain resistant treatment is applied. In the comparison, stain due to silicic acid was artificially caused to adhere to each toilet. For the purpose of the artificial adherence of silicic acid, an aqueous solution containing 200 p.p.m. sodium silicate was prepared and the glazed layers of the respective products were immersed in the solution at 70° C. for three hours in the same manner as in the aforesaid fur resistant test. Consequently, silicic acid stain did not adhere to the Western style flush toilet of the fifth embodiment. On the other hand, silicic acid stain adhered to each of the Western style toilets of compared cases 1 and 2.

Figure 22:
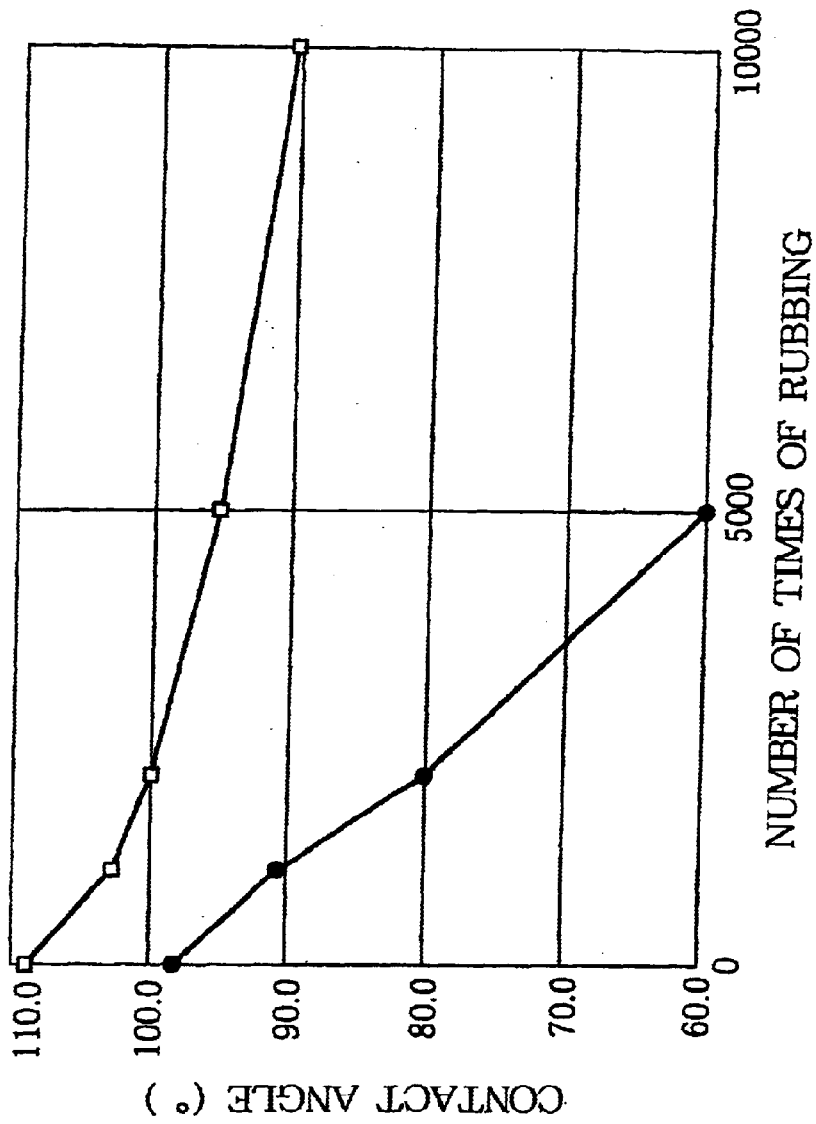
FIG. 22 is a graph showing the relationship between the number of times of wear and a contact angle of water concerning a fifth embodiment and comparison 1.

Furthermore, durability of the layers of the flush toilet of the fifth embodiment and compared case 1 was evaluated. In the evaluation, the same location of each layer was rubbed with a commercially available brush in the same manner as in the aforesaid wear resistance test. The relationship between the number of times of rubbing and a contact angle of water was examined. FIG. 22 shows the results of the examination.

FIG. 22 shows that the water repellency of the layer is not almost reduced in the flush toilet of the fifth embodiment even when the number of times of rubbing is increased. FIG. 22 further shows that the water repellency of the layer is reduced to a large extent in the flush toilet of compared case 1 even when the number of times of rubbing is small. For example, in case that each layer is rubbed ten times per cleaning and the cleaning is carried out four times a week, the same location of the layer is rubbed 2000 times in about 50 weeks in one year. That is, a period of use is 2.5 years when the number of times of rubbing is 5000. The period of use is 5 years when the number of times of rubbing is 10000. Thus, the layer of the flush toilet of the fifth embodiment can achieve high durability.

Although the abrasive agent is used to eliminate the silicic acid stain in the foregoing embodiments, acid ammonium fluoride or hydrofluoric acid may be applied to the treated surface and thereafter, the treated surface may be washed.

The foregoing embodiments are illustrative and the present invention may be enforced in various forms modified without departing from the scope thereof.

INDUSTRIAL APPLICABILITY

The ceramic product of the present invention can accordingly achieve a high stain preventive effect. Further, the method of stain resistant treatment of the present invention can bestow a high stain preventive effect on the ceramic product.

What is claimed is:

1. A sanitary chinaware intended to be repeatedly wetted and dried during use, said sanitary chinaware having a treated surface formed with a layer comprising a stain resistant agent preventing scale from adhering to the sanitary chinaware, said agent including a silicon-containing functional group, previously combined, by dehydrogenation prior to said repeated wetting and drying, with a hydroxyl group which is combinable with soluble silica and which is present on said treated surface.

2. The sanitary chinaware according to claim 1, wherein the silicon-containing functional group does not combine with another silicon-containing functional group.

3. The sanitary chinaware according to claim 1 or 2, wherein the stain resistant agent contains a terminal carbon fluoride group combined with the silicon-containing functional group.

4. The sanitary chinaware according to claim 3, wherein the carbon fluoride group is —$C_nF_{2n+1}$ where n is a natural number in a range of $1 \leq n \leq 12$.

5. The sanitary chinaware according to claim 1 or 2, wherein the stain resistant agent contains a terminal carbon fluoride group combined with the silicon-containing functional group and a terminal alkyl group combined with the silicon-containing functional group, and the number of terminal alkyl groups is larger than the number of terminal carbon fluoride groups.

6. The sanitary chinaware according to claim 1 or 2, wherein the stain resistant agent contains a terminal carbon fluoride group combined with the silicon-containing functional group and a terminal alkyl group combined with said silicon-containing functional group, and the number to terminal carbon fluoride groups is larger than the terminal alkyl groups.

7. The sanitary chinaware according to claim 5, wherein the silicon-containing functional group and the alkyl group are combined with each other be dimethyl siloxane.

8. The sanitary chinaware according to claim 6, wherein the silicon-containing functional group are combined with each other by dimethyl siloxane.

9. The sanitary chinaware according to claim 7, wherein the stain resistant agent is a mixture of a first agent and a second agent, said first agent being a co-hydrolysate of an organic silicon compound containing a perfluoroalkyl group and a methypolysiloxane compound containing a hydrolytic group in a hydrophilic solvent, said second agent being a mixture of organopolysiloxane and a strong acid.

10. The sanitary chinaware according to claim 9, wherein the dimethyl siloxane contains a straight chain combination of the silicon-containing functional group and the alkyl group.

11. A method of preventing scale from adhering to the surface of sanitary chinaware to be used with water and having a treated surface having a hydroxyl group combinable with soluble silica, and which treated surface is to be repeatedly wetted and dried, which method comprises applying a stain resistant agent including a silicon-containing functional group on said treated surface, and combining said silicon-containing functional group with said hydroxyl group present on the treated surface by dehydration or dehydrogenation.

12. The method according to claim 11, wherein the silicon-containing functional group does not combine with another silicon-containing functional group.

13. The method according to claim 11 or 12, wherein the stain resistant agent contains a terminal carbon fluoride group combined with the silicon-containing functional group.

14. The method according to claim 13, wherein the carbon fluoride group is —$C_nF_{2n+1}$ where n is a natural number in a range of $1 \leq n \leq 12$.

15. The method according to claim 11 or 12, wherein the stain resistant agent contains a terminal carbon fluoride group combined with silicon-containing functional group and a terminal alkyl group combined with said silicon-containing functional group, and the number of terminal alkyl groups is larger than the number of terminal carbon fluoride groups.

16. The method according to claim 11 or 12, wherein the stain resistant agent contains a terminal carbon fluoride group combined with the silicon-containing functional group and a terminal alkyl combined with said silicon-containing functional group, and the number of terminal carbon fluoride groups is larger than the number of terminal alkyl groups.

17. The method according to claim 15, wherein the silicon-containing functional group and the alkyl group are combined with each other by dimethyl siloxane.

18. The method according to claim 16, wherein the silicon-containing functional group and the alkyl are combined with each other be dimethyl siloxane.

19. The method according to claim 17, wherein the stain resistant agent is a mixture of a first and a second agent, said first agent being a co-hydrolysate of an organic silicon compound containing a perfluroalkyl group and a methylpolysiloxane compound containing a hydrolytic group in a hydrophilic solvent, said second agent being a mixture of organopolysiloxane and a strong acid.

20. The method according to claim 19, wherein the dimethyl siloxane contains a straight chain of the silicon-containing functional group and the alkyl group.

21. The method according to claim 11, wherein the treated surface to which the stain resistant agent is to be applied had already been used such that the treated surface is a stained surface.

22. The method according to claim 21, further comprising a pretreatment step of reproducing a hydroxyl group on the treated surface.

* * * * *

UNITED STATES PATENT AND TRADEMARK OFFICE
CERTIFICATE OF CORRECTION

PATENT NO.    : 6,709,751 B1
DATED         : March 23, 2004
INVENTOR(S)   : Haruyuki Mizuno et al.

It is certified that error appears in the above-identified patent and that said Letters Patent is hereby corrected as shown below:

Column 15,
Line 44, change "by dehydrogenation" to -- by dehydration or dehydrogenation --.
Lines 61-62, change "combined with the silicon-containing" to -- combined with said silicon-containing --.

Column 16,
Lines 2-3, change "the number to terminal" to -- the number of terminal --.
Lines 3-4, change "than the terminal alkyl groups." to -- than the number of terminal alkyl groups. --.
Line 7, change "other be dimethyl siloxane." to -- other by dimethyl siloxane. --.
Line 9, change "functional group are" to -- functional group and the alkyl group are --.
Line 43, change "with silicon-containing" to -- with the silicon-containing --.
Line 51, change "a terminal alkyl combined with" to -- a terminal alkyl group combined with --.
Lines 59-60, change "the alkyl are combined" to -- the alkyl group are combined --.
Line 60, change "other be dimethyl siloxane" to -- other by dimethyl siloxane --.
Line 62, change "a first and" to -- a first agent and --.
Line 64, change "a perfluroalkyl group" to -- a perfluoroalkyl group --.

Column 17,
Line 2, change "a straight chain of" to -- a straight chain combination of --.
Lines 5-6 change "to be applied had already" to -- to be applied has already --.

Signed and Sealed this

Thirtieth Day of November, 2004

JON W. DUDAS
*Director of the United States Patent and Trademark Office*